United States Patent [19]

Dotti

[11] 4,026,119

[45] May 31, 1977

[54] DEVICE FOR CONVEYING A FLUID BETWEEN A SUBSEA DUCT AND A BUOY

[75] Inventor: Giuseppe Dotti, Milan, Italy

[73] Assignee: Snamprogetti, S.p.A., Milan, Italy

[22] Filed: Dec. 3, 1975

[21] Appl. No.: 637,126

[30] Foreign Application Priority Data

Dec. 3, 1974 Italy .................................. 30123/74

[52] U.S. Cl. ..................................... 61/95; 61/114;
9/8 P; 141/388; 285/45; 285/273
[51] Int. Cl.[2] .................. E02B 17/00; B63B 21/00;
B65B 1/04
[58] Field of Search ............. 61/46, 46.5, 64, 72.3, 61/95; 285/273; 141/388; 9/8

[56] References Cited

UNITED STATES PATENTS

| | | | |
|---|---|---|---|
| 1,811,736 | 6/1931 | Bezel | 285/273 X |
| 2,473,618 | 6/1949 | Stillwagon, Jr. | 285/45 X |
| 3,614,869 | 10/1971 | Flory et al. | 61/46 |
| 3,669,470 | 6/1972 | Deurloo | 285/45 |
| 3,750,723 | 8/1973 | Schirtzinger | 61/46.5 |

Primary Examiner—Jacob Shapiro
Attorney, Agent, or Firm—Ralph M. Watson

[57] ABSTRACT

For conveying a fluid from or towards a subsea duct by means of a buoy having universal type joints, the improvement consisting in that the joint pins and the buoy legs have hollow spaces or bores therein to allow fluid flow therethrough.

10 Claims, 6 Drawing Figures

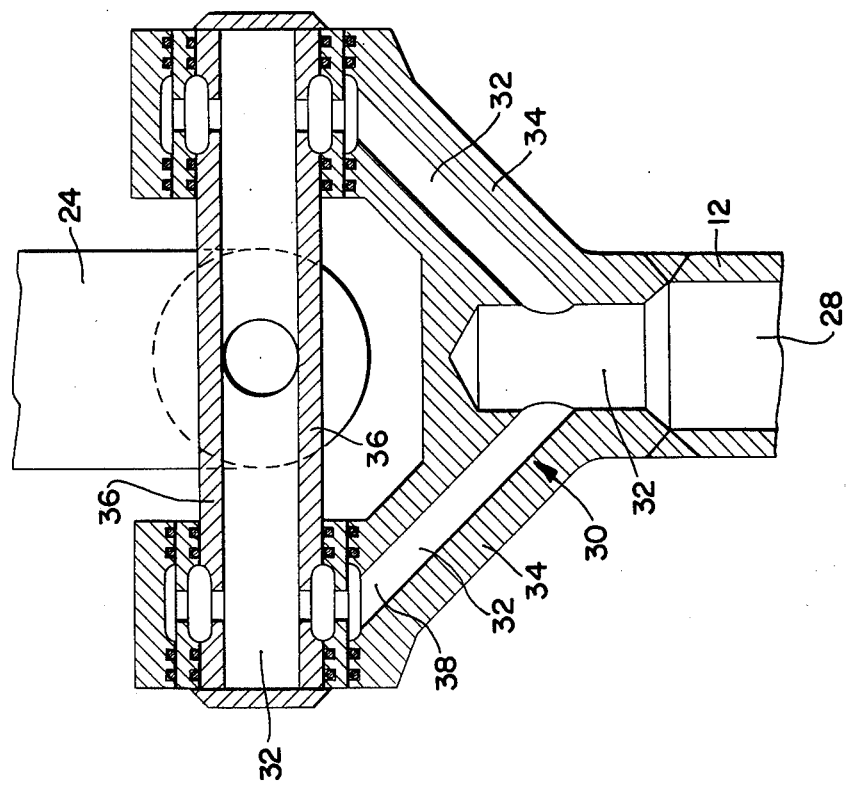
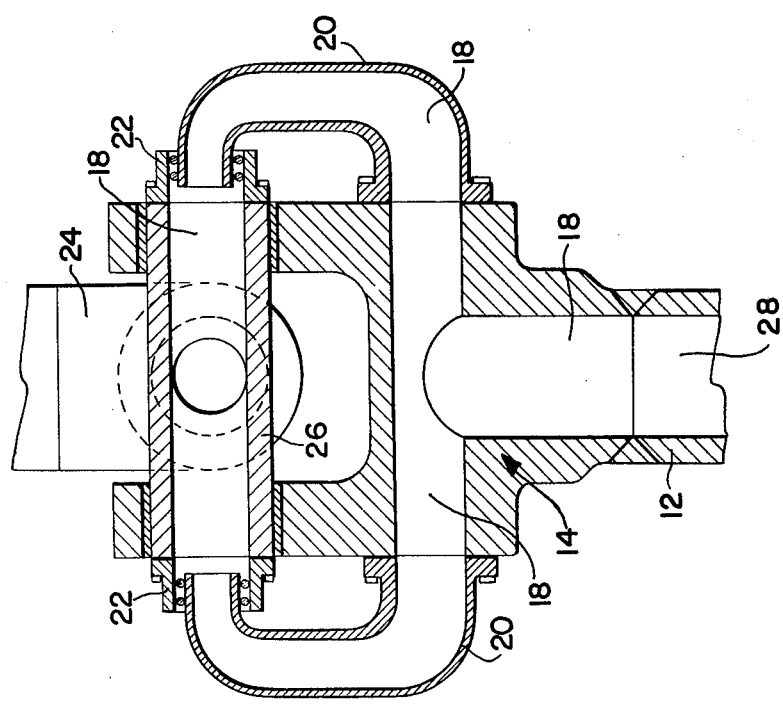

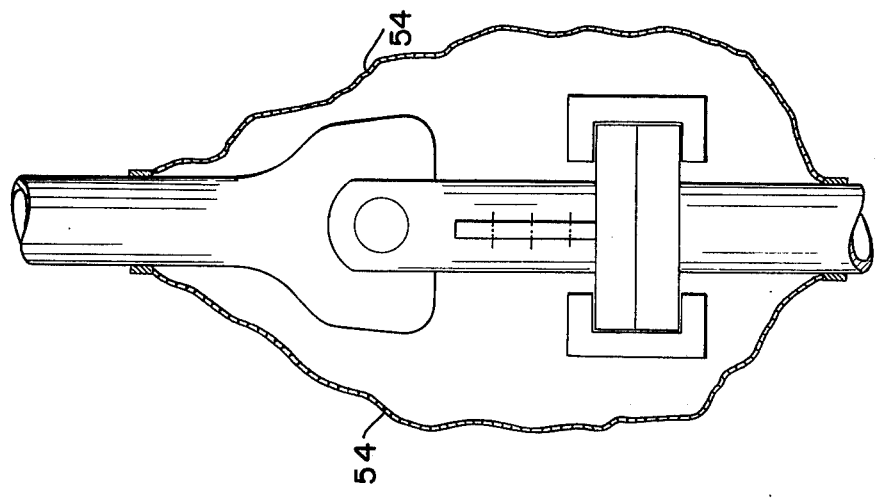
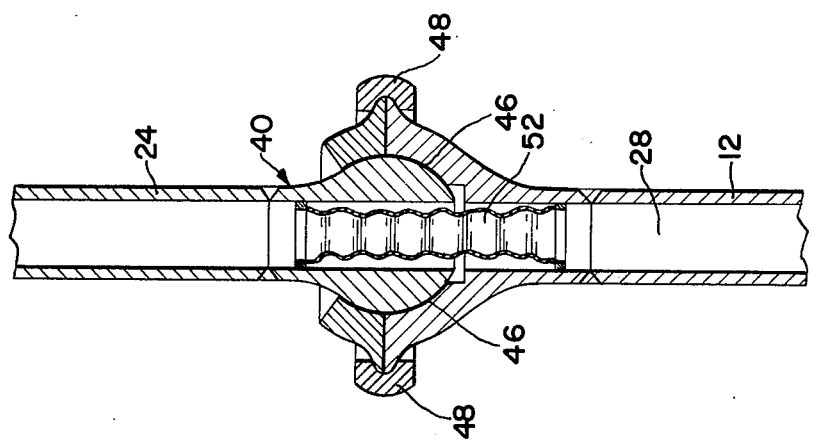
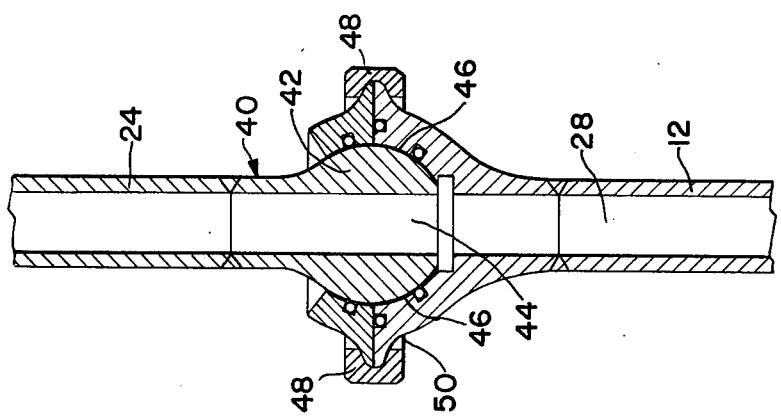

DEVICE FOR CONVEYING A FLUID BETWEEN A SUBSEA DUCT AND A BUOY

This invention relates to a device for conveying a fluid from or through a subsea duct to or from a buoy which utilizes cardan or spherical joints. More particularly the present invention relates to a device which permits the conveyance of a fluid through the articulated legs of a buoy and through cardan or spherical joints constructed in accordance with this invention.

The present technology for the conveyance of a fluid from or through a subsea duct to or from a buoy, uses hoses which freely fall down from the buoy and are inserted at the sea bottom into the subsea duct. This method does not provide a stable and reliable conveyance of fluid. The hoses are made of materials which do not possess the necessary resistance and flexibility properties for use in the sea for prolonged periods of time. In addition, such hoses under a buoy do not maintain a fixed position with respect to the buoy and are prone to the influence the sea so that they do not allow for a regular and reliable flow of liquid and the chance of hose breakage is substantial.

It now has been found that a buoy, having anchoring articulated legs which utilize cardan or spherical joints shaped in an appropriate manner, can be used to convey a fluid from or through the subsea duct. By so doing the defects due to the instability of hoses mounted under a buoy are removed and the flow of the fluid can take place in a reliable manner.

In the following, reference will be made to such joints when used in the device according to the invention, but it can easily be understood that they can be employed in any fluid conveyance system which requires articulated structures involving cardan or spherical joints.

The cardan joints used to convey fluids are the types which have a plurality of pivots arranged crosswise where both the pins and the forks have internal hollow spaces and/or drillings. It also would be possible to use stiff or flexible tubing systems placed outside the joints to convey fluid partly through the joint and partly through outside tubing. The spherical joints, which are also adapted to convey fluid therethrough, are joints equipped with gaskets, or gasket-less types with an internal bellow made of appropriate materials to convey fluid without losses or oozing.

In addition, to enhance the protection of the joints with a resultant improved efficiency, protection systems are provided which employ, in addition to special paints and/or surface treatments for protecting them from the corrosion, gauzes or bellows made of appropriate materials such as monel, stainless steel, special fabrics or synthetic fibers, pure nickel. These gauzes and bellows protect the joints from possible drawbacks, such as as caused by algae, gravel, mussels and the like. Thus, the use of such a device enables the flow of fluid to be carried out through the legs and articulations of the articulated-leg buoy without the use of hoses conventionally placed under the buoy.

In particular, in the ensuing description, reference is had to the device in question as applied to an articulated-leg buoy, such a description being illustrative of the present invention but without limitation.

IN THE DRAWINGS

FIG. 2 is a sectional view of the cardan type joint shown in FIG. 1 which is connected to the buoy and the articulated leg thereof and through which fluid is conveyed;

FIG. 3 is a sectional view of another cardan type joint of the present invention through which fluid is conveyed between the articulated leg and buoy;

FIG. 4 is a sectional view of a hollow spherical joint of the invention through which fluid is conveyed;

FIG. 5 is a sectional view of the spherical joint of FIG. 4 in which internal bellows are used to prevent fluid losses and seepage; and FIG. 6 is a side view, partly in section, of a joint of the present invention which is protected by a surrounding gasket.

Figure 1:
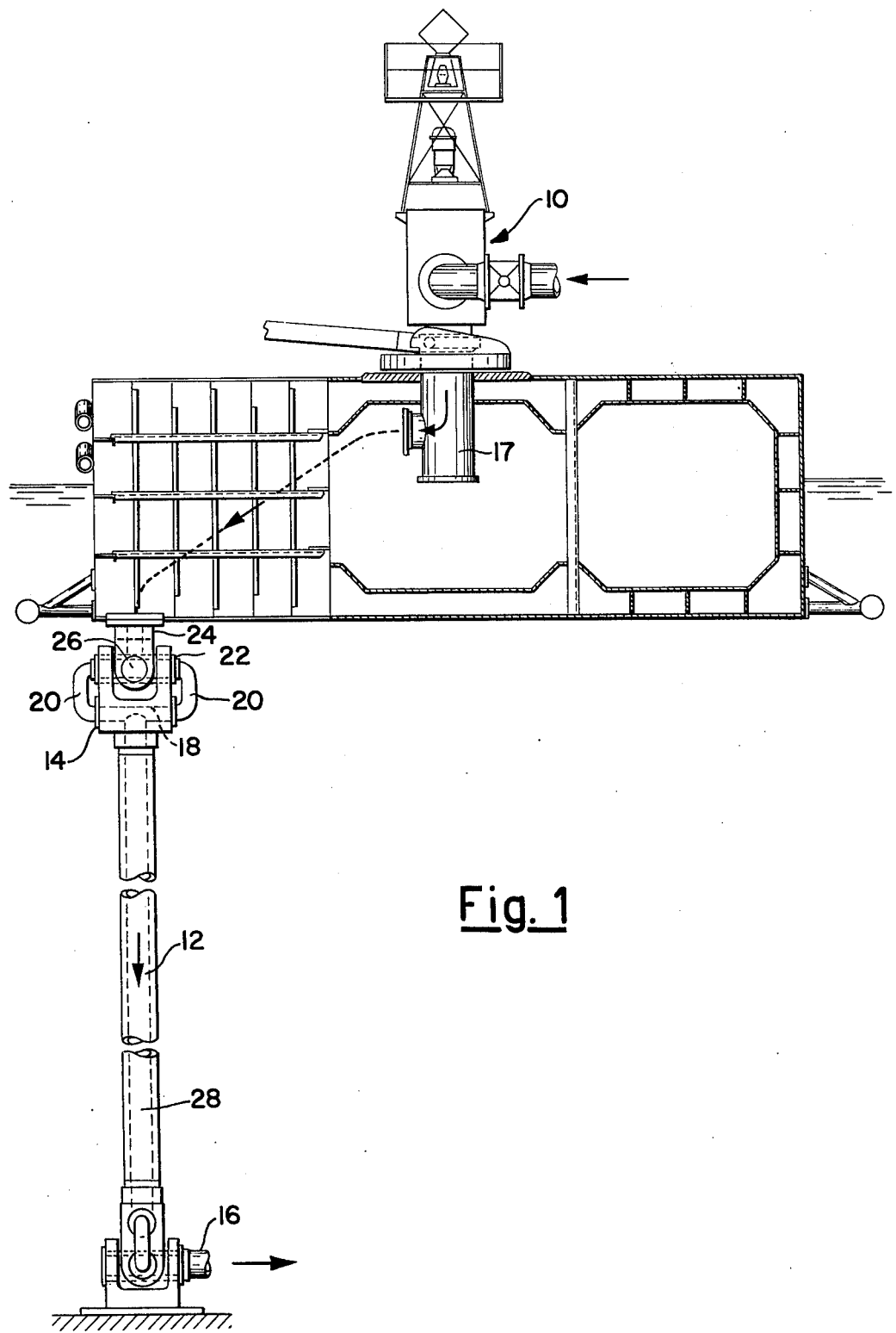
FIG. 1 is a side view of one embodiment of the invention illustrating the conveyance of fluid between the buoy and the subsea duct in accordance with the present invention.

With reference to FIG. 1, there is shown an overall view of a buoy 10 which uses its own legs 12 and the cardan joints 14, constructed in accordance with one embodiment of the present invention, for conveying a fluid from or through a subsea duct 16. As shown the fluid is conveyed from the conduit 17 of the buoy 10, through the joint 12, legs 14 and to the duct 16.

More particularly, with reference to FIG. 2, the joint 14 has internal hollow spaces and/or bores 18 with the addition of an outer tubing 20, which is properly shaped and adapted to allow an easy flow to the moving fluid.

The cross-pin 22, also hollow, is united to the fixed tubing 24 of the buoy 10, which forms a part of the conduit 17, by a swivel 26 and the entire movable assembly is protected by appropriate gaskets. As also shown in FIG. 2, the leg 12 has a hollow space 28 for conveying fluid to and from the buoy 10 and duct 16.

With reference to FIG. 3, there is shown a joint 30 having internal hollow spaces and/or bores 32 adapted to allow an unhindered flow of the moving fluid. In this kind of joint, the fluid flows directly from the forks 34 to the cross-pin 36 through throats, hollow spaces or bores 32 formed through the bushings and the pin itself, without adding to the forks any outer tubings. The entire assembly is protected by appropriate gaskets.

With reference to FIG. 4 a kind of spherical joint 40 is shown which moves within a wide-angle rotation cone 42, and which has internal hollow spaces and/or bores 44 to allow fluid flow. The spherical seat 46 is halved in order to facilitate assembly and disassembly; the two halves are brought together by bolts or a like system, or also by a halved collar having a sloping seat 48 and the two halves are united by a bolt set.

The spherical joint is equipped in addition with an appropriate set of resilient gaskets or spring-biassed rigid gaskets 50.

With reference to FIG. 5, there is shown a gasket-less spherical joint 40 which is equipped, however, with a bellow system 52, the latter permitting both the fluid flow without losses or seepage and movement of the joint 40. The bellow 52 is made with appropriate materials such as monel, stainless steel, high resistance special steels, nickel, special red alloys, special rubbers or elastomers.

With reference to FIG. 6 there are shown the protection systems as used for such joints. Special corrosion-preventing paints are used and also gauzes or bellows 9 of monel, stainless steel, special synthetic fabrics or fibers, and nickel and their purpose is mainly that of preventing damages from algae, gravel and mussels.

What we claim is:

1. A device for conveying fluid between a subsea duct and a buoy, comprising:
   a buoy having a conduit for conveying fluid,
   articulated hollow legs for anchoring said buoy,
   joints adjacent said buoy which connect said buoy to said legs and which have bores therethrough that connect the conduit of said buoy to the interior of said hollow articulated legs,
   a subsea duct which opens into said hollow articulated legs below said joints, and
   a passageway formed by each of said interconnected hollow legs and bores of each of said joints for conveying fluid between said buoy and said subsea duct.

2. The device of claim 1, wherein said joints are of the cardan type.

3. The device of claim 2,
   wherein each of said cardan joints includes forked extensions and a cross pin connected to said extensions, said extensions and pin having bores therethrough for conveying fluid through said joint; and
   wherein a hollow swivel is connected to said cross pin and into the conduit of the buoy for conveying fluid between said joint and buoy.

4. The device of claim 3, wherein said joints include outer tubing which connects said bore in said forked extensions to said bore in said cross pins.

5. The device of claim 3, wherein bores extend through each forked extension which are open to said hollow legs and said bores in said cross pin.

6. The device of claim 1, wherein said joints are surrounded by a gasket which prevents fluid losses.

7. A device according to claim 1, characterized in that the joints are spherical joints.

8. A device according to claim 7, characterized in that the spherical joints are equipped with bellows.

9. A device according to claim 5, characterized in that the bellows of the spherical joints are made from materials selected from the group consisting of monel, stainless steel, special high resistance steels and corrosion resistant steels, nickel, special red alloys, special rubbers and elastomers.

10. A device according to claim 7, characterized in that the spherical seat of the joint is halved and the two halves are kept united together by a system of jaws having sloping seats.

* * * * *

UNITED STATES PATENT OFFICE
CERTIFICATE OF CORRECTION

Patent No. 4,026,119  Dated May 31, 1977

Inventor(s) Giuseppe Dotti

It is certified that error appears in the above-identified patent and that said Letters Patent are hereby corrected as shown below:

Column 4, line 16, Before the comma "," Correct "claim 5" to read --claim 8--.

Signed and Sealed this

Twenty-fourth Day of October 1978

[SEAL]

Attest:

RUTH C. MASON
*Attesting Officer*

DONALD W. BANNER
*Commissioner of Patents and Trademarks*